Dec. 25, 1934.  H. L. BLUM  1,985,400
FLUID METER
Filed July 29, 1930   5 Sheets-Sheet 1

Inventor:
Hosmer L. Blum,
By Chas. M. Nissen,
Atty.

Dec. 25, 1934.  H. L. BLUM  1,985,400
FLUID METER
Filed July 29, 1930  5 Sheets-Sheet 2
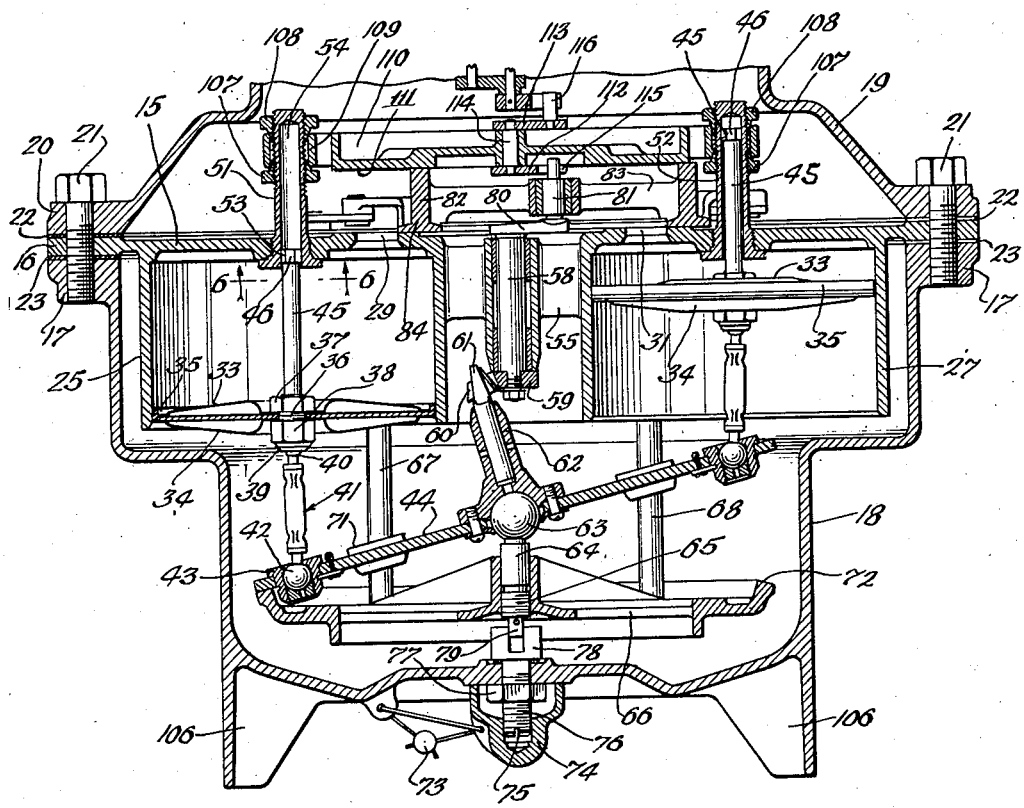

Dec. 25, 1934.  H. L. BLUM  1,985,400
FLUID METER
Filed July 29, 1930  5 Sheets-Sheet 4

Inventor:
Hosmer L. Blum,
By Chas. M. Nissen,
Atty.

Dec. 25, 1934.  H. L. BLUM  1,985,400
FLUID METER
Filed July 29, 1930  5 Sheets-Sheet 3

Inventor:
Homer L. Blum,
By Chas. M. Nissen,
Atty.

Dec. 25, 1934.    H. L. BLUM    1,985,400
FLUID METER
Filed July 29, 1930    5 Sheets-Sheet 5

Inventor:
Hosmer L. Blum,
By Chas. M. Nissen,
Atty:-

Patented Dec. 25, 1934

1,985,400

UNITED STATES PATENT OFFICE 1,985,400

FLUID METER

Hosmer L. Blum, Fort Wayne, Ind., assignor to S. F. Bowser & Company, Inc., Fort Wayne, Ind., a corporation of Indiana Application July 29, 1930, Serial No. 471,554

15 Claims. (Cl. 73—30)

My invention relates to volumetric displacement meters comprising cylinders and pistons, and one of its objects is the provision of improved and efficient ports and valve mechanism for controlling the same in such meters.

A further object of the invention is the provision of adjustable mechanism for spacing valve seats separately and independently of the cover of the meter.

Another object of the invention is the provision of improved guiding mechanism for pistons of volumetric displacement meters.

Another object of the invention is the provision of an improved and efficient construction for volumetric displacement meters to compel the flow to and from the bottom of the meter to prevent separation of foreign matter from the fluid and its accumulation at the bottom of the meter, tending to interfere with the accurate operation thereof.

A further object of the invention is the provision of improved and efficient parallel motion mechanism for a valve of a volumetric displacement meter.

A further object of the invention is the provision of accurately mounted valve seats for a volumetric displacement meter to enable the use of a slidable valve which is rigid throughout.

Other objects of the invention will appear hereinafter, the novel features and combinations being set forth in the appended claims.

In the accompanying drawings—

Fig. 2 is another sectional elevational view taken diametrically of two of the cylinders;

Fig. 4 is a plan view of the parallel motion mechanism for the valve which is shown associated with the lower valve seat and the ports therein;

Figure 1:
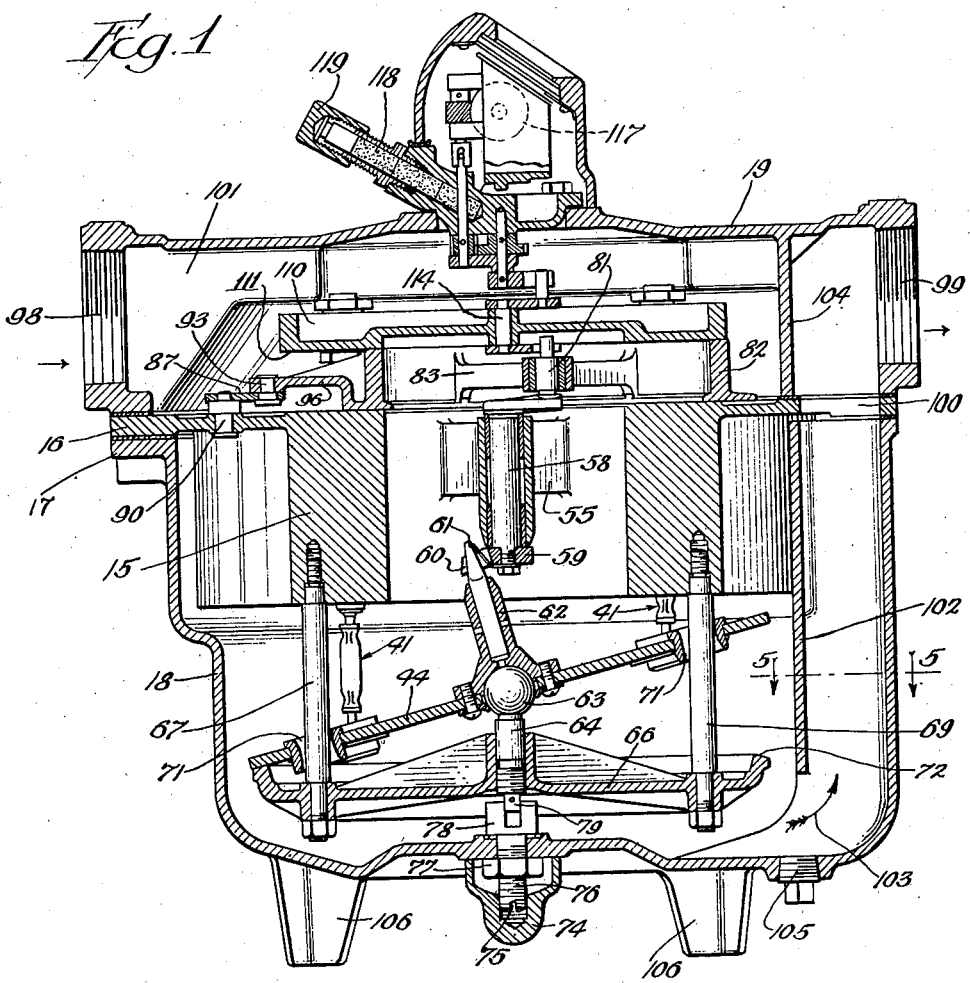
Fig. 1 is a sectional elevation of a volumetric displacement meter embodying my improvements.
Figure 5:
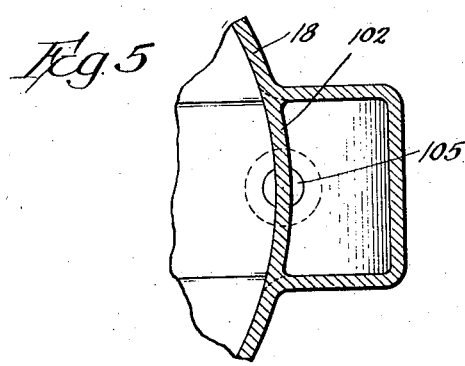
Fig. 5 is a sectional plan view on the line 5—5 of Fig. 1.
Figure 3:
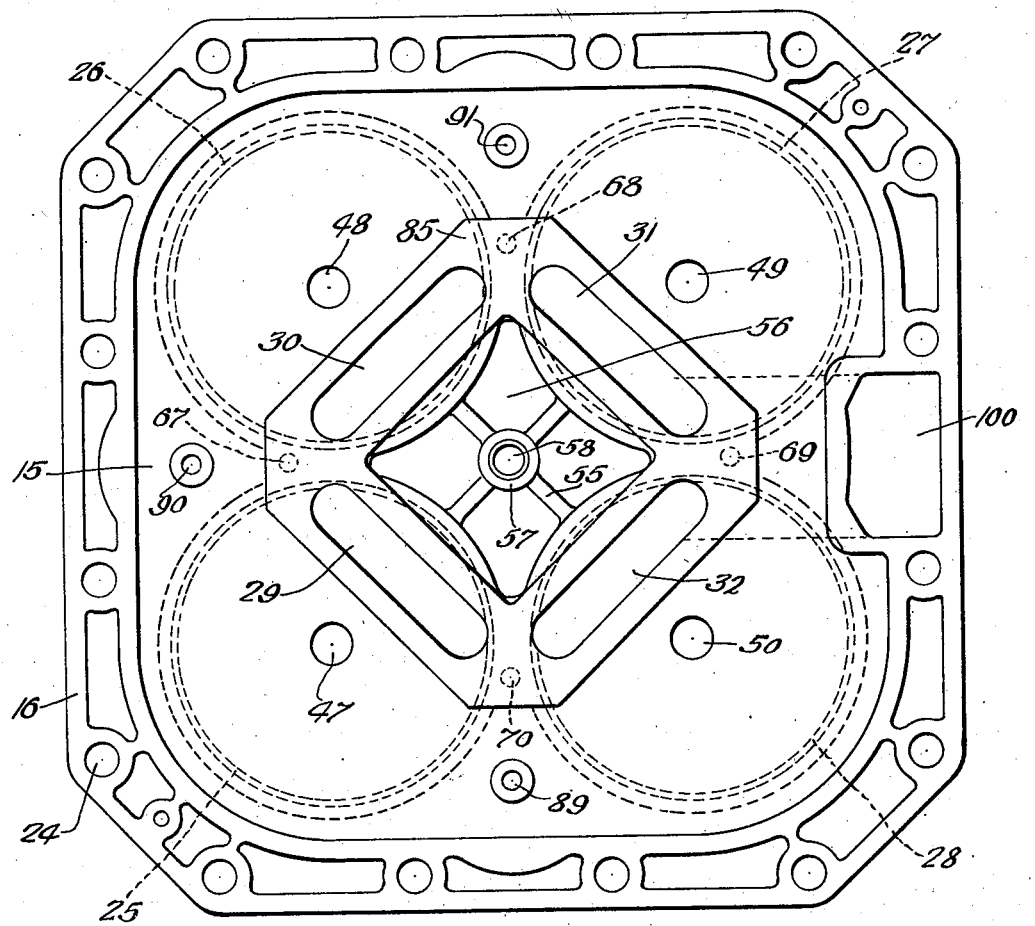
Fig. 3 is a plan view of the cylinder block with the lower valve seat thereon.

In Fig. 1 the cylinder block 15 is shown provided with a radial flange 16 against the lower side of which is adapted to fit a flange 17 of the meter bowl 18. The cover 19 of the meter is also provided with a flange 20 which is adapted to rest on the flange 16, as shown in Fig. 2. By means of cap screws 21, 21 the flanges 16, 17 and 20 may be rigidly secured together and a liquid-tight fit effected by means of the gaskets 22 and 23. As shown in Fig. 3, the cap screws 21 pass through openings 24 in the flange 16 of the cylinder block 15.

The cylinder block 15 is shown provided with four cylinders 25, 26, 27 and 28, each of which is closed at its upper end except for the ports 29, 30, 31 and 32, and each of which is open at its lower end as shown in Fig. 2. Although four cylinders are shown in this instance, it should be understood that the number may be varied as desired.

In each cylinder is a piston comprising upper and lower elements 33 and 34 with a leather cup 35 clamped at their peripheries. The screw-threaded piston rod 36 extends through the centers of the flexible elements 33, 34 and the leather cup 35 and is provided with nuts 37 and 38 to hold the parts of the piston secured together and to the piston rod. The piston in each of the other cylinders is likewise constructed.

Figure 7:
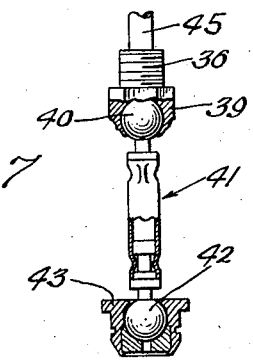
Fig. 7 is an elevational view, partly in section, to show the details of the flexible connection between the bottom of each piston and the wabble plate.

Depending from the piston rod 36 is a ball socket 39 for receiving the ball 40 as shown in Figs. 2 and 7. The ball 40 is provided with a fixed connection 41 with the lower ball 42, the latter fitting in the ball socket 43 in the peripheral portion of the wabble plate 44.

Between the bottom of each piston and the peripheral portion of the wabble plate immediately below the same, is a double ball and socket joint with an intermediate fixed connection similar to that illustrated in Fig. 7.

Figure 6:
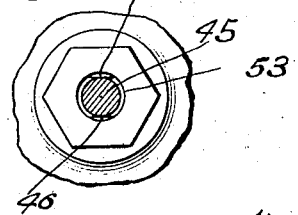
Fig. 6 is a sectional view taken on the line 6—6 of Fig. 2 looking upwardly as indicated by the arrows.

Extending upwardly from each piston rod is a vertical guide rod 45, the upper end of which has an enlarged head 53 provided with flat faces 46, 46, on opposite sides as shown in Figs. 2 and 6. A similar guide rod with an enlarged upper end having flat faces is connected to the top of the center of each piston.

Fig. 3 shows four openings 47, 48, 49 and 50 in the centers of the upper ends of the cylinders 25, 26, 27 and 28. Screw-threaded into these openings 47, 48, 49 and 50 are guide tubes, two of which are shown at 51 and 52 in Fig. 2 for the openings 47 and 49 of Fig. 3. These guide tubes are closed at their upper ends and are adapted to receive the heads 53 at the upper ends of the rods 45. When the pistons are reciprocated the flat faces 46 afford sufficient spaces between the rod 45 and the interior wall of the tubular guide to permit free movement of the liquid into and out of the chamber 54.

Between the outer walls of the cylinders are spider supporting brackets 55 as shown in Figs. 2 and 3 with passageways 56 between the same for free downward flow of the liquid as hereinafter more fully explained. The spider arms 55 support a central vertical bearing 57 for the driving shaft 58, to the lower end of which is connected a crank 59 slotted at 60 to receive the upper flatted end 61 of the upright actuating arm 62 mounted at the center of the wabble plate 44.

The wabble plate 44 is mounted on a stationary ball bearing 63 which is supported on the upper end of the rod 64, the lower end of which is screw-threaded at 65 into the center of the track plate 66. This track plate is supported from the cylinder block 15 by means of the vertical spaced-apart suspension rods 67, 68, 69 and 70. The upper ends of these suspension rods may be screwed into the bottom of the cylinder block 15 as shown in Fig. 1 and the lower ends bolted to the track plate 66.

The wabble plate 44 is provided with a bearing 71 comprising an opening in the plate, which bearing surrounds one of the suspension rods. The plate 44 is therefore free to wabble but will be prevented from rotation by reason of the suspension rods 67—70 extending through the openings in the wabble plate. The peripheral edge of the wabble plate 44 rolls on the track 72 of track plate 66 as the pistons are operated successively by reciprocating in their respective cylinders. The lengths of the strokes of the pistons may be regulated by varying the elevation of the ball bearing 63. This may be done by removing the seal 73 shown in Fig. 2, taking off the cap 74 and then applying a screw-driver to the transverse slot 75 in the screw rod 76 after the nut 77 has been released. Turning of the rod 76 will operate the interior key 78 connected to the lower end 79 of the rod 64. The ball bearing 63 will thus be adjusted in elevation. Such adjustment in elevation of the center of the wabble plate 44 will correspondingly adjust the elevation of the balls 42 and consequently vary the uppermost limit of the piston in each cylinder. In this way the volume passing through the meter for each rotation of the shaft 58 may be regulated.

The upper end of the shaft 58 is provided with a crank 80, to the outer end of which is secured the vertical bearing 81 on which is journaled the center of the valve 82. The peripheral portion of the valve 82 is of an inverted T-shape as shown in Fig. 2 and is provided with radial spider arms 83 as shown in plan view in Fig. 4 so as to afford a free and unobstructed passageway from the ports 29, 30, 31 and 32 to the passageways 56 which lead downwardly between the spider arms 55.

It should be particularly noted that the outer edges of the foot portion 84 of the valve 82 are rectilinear corresponding to the rectilinear spaced-apart edges of the adjacent ports in the lower valve seat. In the present instance I have shown four symmetrically arranged cylinders each with an elongated port in its upper end having parallel spaced apart walls and therefore the valve 82 and the valve seat shown at 85 in Fig. 3 is substantially square in shape, but it should be understood that the shape will vary according to the number of cylinders. For instance, if there are six cylinders in the meter, the valve 82 and the valve seat 85 would be hexagonal in shape but the ports for each cylinder would have the shape shown in Fig. 3 and the spaced-apart straight edges at the inner and outer sides of the foot 84 adjacent the corresponding port would be parallel to the edges of such ports. It should also be noted that the width of the foot 84 of the valve 82 corresponds in width to the port with which it is associated. When the valve 82 is in the position shown in Fig. 4, the ports 30 and 32 are each entirely closed because the width of the foot 84 is just sufficient to register with the width of the ports 30 and 32. When the valve 82 is in the position shown in Fig. 4, the ports 29 and 31 are each wide open.

In order to maintain the inner and outer edges of the foot 84 of the valve 82 parallel at all times with the inner and outer edges of the adjacent ports, I have provided parallel motion mechanism comprising cranks 86, 87 and 88 pivoted on fixed axes 89, 90 and 91 to the top of the cylinder block 15. The free ends of the cranks 86, 87 and 88 are pivoted at 92, 93 and 94 to arms 95, 96 and 97 which extend from three of the corners of the valve 82 as shown in Fig. 4. When the crank 80 is rotated by the shaft 58 the center of the valve is rotated in a circle and all portions of the endless valve member or foot 84 are moved in circles parallel to the circle described by the axial center of the valve. Therefore the pivots 92, 93 and 94 will describe parallel circles each having a radius of equal length and the same as the radius of the crank 80.

By referring to Figs. 8 to 14, inclusive, it will be seen that the parallel motion mechanism always maintains the straight edges of the valve adjacent the ports parallel to the edges of the adjacent ports. In Fig. 1 the inlet port of the meter is shown at 98 and the outlet port at 99. The outlet port communicates with the port opening 100 shown at the right-hand side of the cylinder block 15 in Figs. 1 and 3. The liquid enters from the inlet port 98 into the chamber 101 and thence flows through the ports 29, 30, 31 and 32 when these are respectively outside of the valve 82. The flow through the ports into the cylinders depress the pistons until they reach the lower limits of their strokes. When the pistons are about to move upwardly the upper port of its cylinder should be closed and about to open into the interior of the valve 82. While the pistons move upwardly the flow will be to the interior of the valve and downwardly through the passageways 56 to the bottom of the bowl 18.

The partition 102 shown in Fig. 1 extends from the port 100 to a position near the bottom of the bowl so as to compel the flow of the liquid to the bottom of the bowl below the track plate 66 and thence upwardly as indicated by the arrow 103 in Fig. 1 to the port 100 and the outlet port 99. The partition 104 in the cover 19 separates the outlet port 99 from the chamber 101. Such downward flow of the liquid through the center of the cylinder block to the bottom of the bowl 18 and thence upwardly as indicated by the arrow 103 to the outlet port 99 will prevent the accumulation of foreign matter and the freezing thereof if it is water separated from gasoline. The prevention of accumulation of deposits from oil or other liquids being metered will also avoid retardation of movement of the various operating parts. That is to say, the efficiency of accurate measurement of the meter is maintained by preventing accumulation of deposits from the liquid or sediment therefrom. However, a plug 105 may be provided for an opening in the bottom of the bowl 18 so that the latter may be emptied when desired and the condition of the liquid at the bottom of the bowl inspected. For support the bowl 18 may be provided with supporting feet 106 as shown in Fig. 1.

Figure 8:
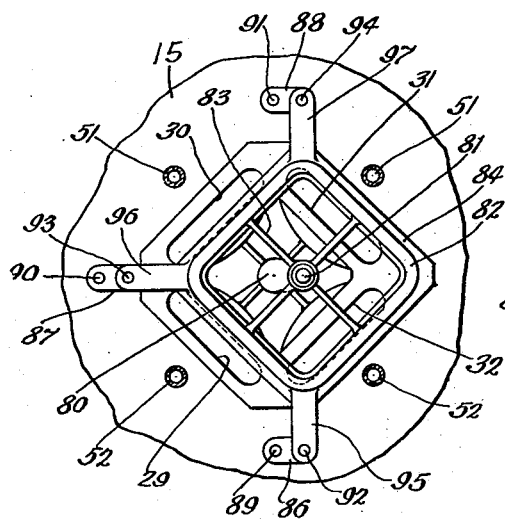
Figs. 8 to 14, inclusive, are views similar to Fig. 4 and showing the valve in its various positions relative to the ports in the lower valve seat during the complete cycle of operation of the pistons in the cylinder.

The sequence of operation may be understood by referring to Figs. 4, and 8 to 14, inclusive. It will be assumed that the shaft 58 as viewed in plan is rotated clockwise. In Fig. 4 the port 29 is directly open to the inlet port 98 and the port 31 is wide open from the cylinder 27 to the outlet port 99. In Fig. 8 the port 32 is opening toward the outlet port 99 and therefore the piston in the cylinder 28 is moving upwardly. Also in Fig. 8 the port 30 is opening toward the inlet port 98 and the piston in the cylinder 26 is therefore moving downwardly. The port 31 which has been wide open to the outlet port 99 is now closing as the piston in the cylinder 27 is moving upwardly. The port 29 which has been wide open to the inlet port is now closing while the piston in the cylinder 25 is moving downwardly.

Figure 9:
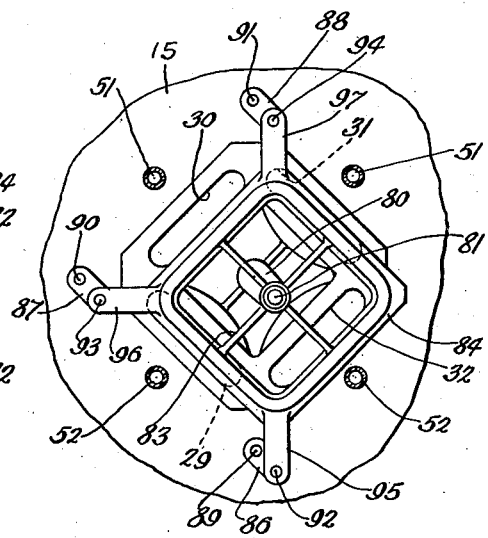

In Fig. 9 the ports 29 and 31 are entirely closed; the port 30 is entirely open to the inlet port 98 and the port 32 is entirely open to the outlet port. At this time the piston in the cylinder 27 is at the upper limit of its stroke and the piston in the cylinder 25 is at the lower limit of its stroke. The piston in the cylinder 26 is moving downwardly and the piston in the cylinder 28 is moving upwardly.

Figure 10:
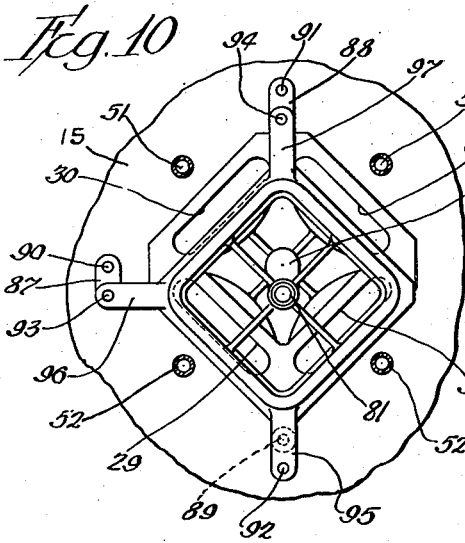

In Fig. 10 the port 29 is shown opening toward the outlet port 99; the port 31 is opening to the inlet port 98; the port 30 is closing and the port 32 is closing.

Figure 11:
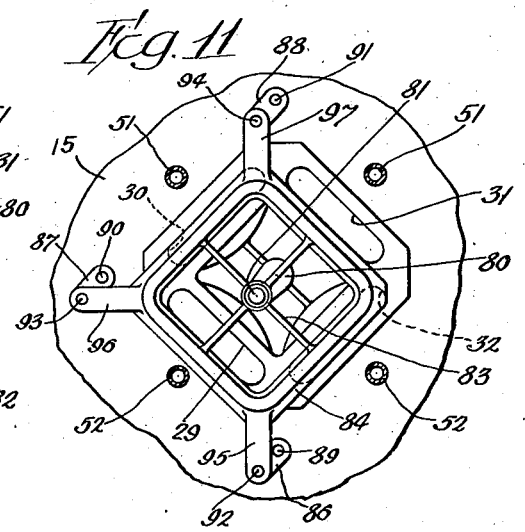

In Fig. 11 the ports 30 and 32 are entirely closed and the ports 29 and 31 are entirely open, but the port 31 now communicates with the inlet port 98 and the port 29 communicates with the outlet port 99.

Figure 12:
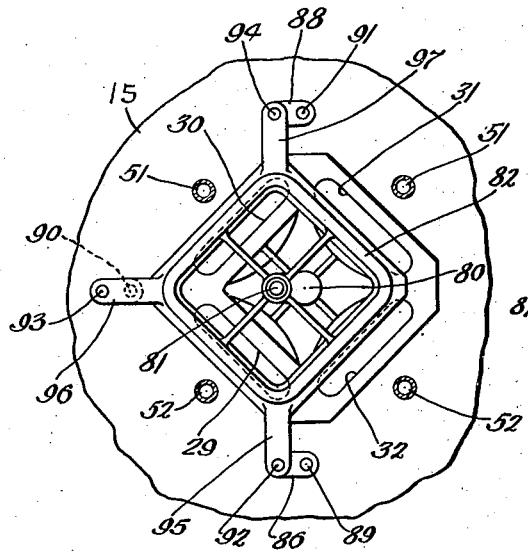

In Fig. 12 the port 30 is opening to the outlet port 99 and the port 32 is opening to the inlet port 98. At the same time the ports 29 and 31 are closing.

Figure 13:
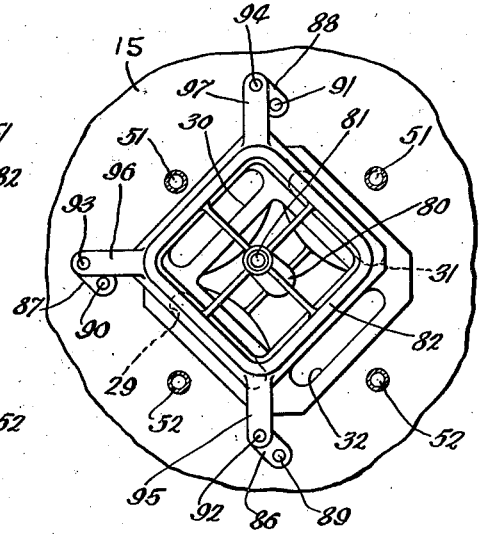

In Fig. 13 the ports 29 and 31 are entirely closed and the ports 30 and 32 are entirely open but now the port 30 communicates with the outlet port 99 and the port 32 communicates with the inlet port 98.

Figure 14:
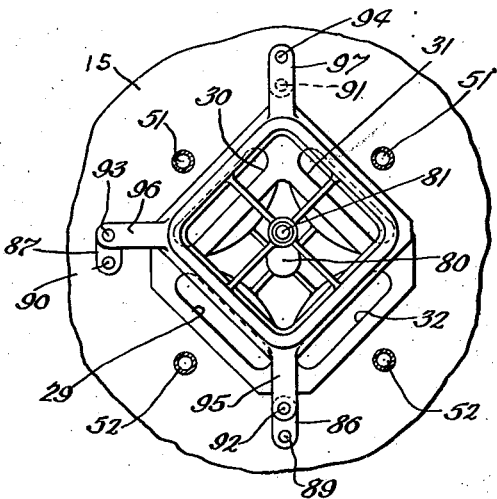

Fig. 14 shows the port 29 opening to the inlet port 98 and the port 31 opening to the outlet port 99. At the same time the ports 30 and 32 are closing. The parts each resume the positions shown in Fig. 4, having made the complete cycle from Fig. 4 through Figs. 8 to 14, inclusive.

By referring to Fig. 2 it will be seen that the upper ends of the tubular guides 51 are screw-threaded to receive the adjusting nuts 107, 108 having respectively upwardly and downwardly conical faces fitting into the cylindrical openings 109 in the peripheral portion of the valve plate 110. There being four vertical posts or standards 51 and 52 each rigidly connected to the top of the cylinder block 15, there is a corresponding number of holes 109 at the peripheral portion of the plate 110. By loosening the top adjusting nuts 108 the lower adjusting nuts 107 may be individually turned on each post and therefore the elevation and inclination of the plate 110 may be varied as desired. The lower surface of the plate 110 affords the valve seat for the upper side of the valve 82.

By such adjustment individually on the four spaced-apart posts, the upper valve seat for the valve 82 may be very accurately positioned and therefore a solid or rigid valve 82 may be employed with the assurance that the valve seats 85 and 111 will be in parallel spaced-apart planes.

After the adjustment has been made by means of the lower adjusting nuts 107 the upper adjusting nuts 108 may be clamped in position to hold the plate 110 in stationary position rigidly connected to the top of the cylinder block 15.

It should be particularly noted that the upper valve seat may be adjusted so as to fit accurately the top of the valve 82 without relying on any adjustment of the cover 19. If the valve plate 110 were connected to the cover 19 it can readily be seen that any adjustment attempted by means of the cap screws 21 would cause the gaskets 22 and 23 or either of them to prevent accurate adjustment. By having the plate 110 entirely separate and independent of the cover 19 or any gaskets associated therewith, the upper valve seat 111 may be very accurately positioned for the upper side of the solid or rigid slide valve 82.

The plate 110 may serve to support the cranks 112 and 113 mounted at the upper and lower ends of the shaft 114 which is journaled in a bearing in the plate 110. A pin and slot connection at 115 enables the rotation of the bearing 81 in a circle to transmit rotation to the cranks 112 and 113. A pin and slot connection at 116 may transmit movement to the gearing which is connected to the counter or registering mechanism shown at 117 in Fig. 1.

A plastic packing 118 with packing compression cap 119 to prevent leakage of liquid into meter may be extended to the gearing of the counter or registering mechanism as shown in Fig. 1.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. In a meter, the combination with displacement mechanism, of means affording a plurality of ports therefor each having spaced-apart parallel walls, a valve member associated with means forming a space for fluid flow from said ports, said valve member having inner and outer edges in spaced-apart parallel relation with the walls of adjacent ports, parallel motion mechanism including pivoted connections between the valve and the valve seat for maintaining at all times such spaced-apart parallel edges in parallelism with the adjacent parallel port walls, and means operatively associated with the displacement mechanism for operating said valve.

2. In a meter, the combination with displacement mechanism, of means affording a plurality of elongated ports therefor each having parallel spaced-apart straight walls, a valve member having the portions thereof adjacent the respective ports provided with inner and outer straight edges in parallelism to each other and in parallelism to the spaced-apart walls of the adjacent port, parallel motion mechanism including pivoted connections between the valve and the valve seat for maintaining such parallel relation of said straight edges to the walls of the adjacent port, and means operatively associated with the displacement mechanism for operating said valve.

3. A meter having controlling ports, a valve therefor, means associated with the center of the valve for rotating said valve, and cranks pivoted on fixed spaced-apart axes and each pivotally connected to said valve to ensure movement of portions of said valve in parallelism to each other.

4. A volumetric displacement meter comprising a bowl and a cover for said bowl, displacement mechanism in said bowl, means forming ports for said mechanism, a slidable valve operable by said displacement mechanism to operate said valve and for controlling said ports, means affording seats for said valve in spaced-apart parallel planes, and means for holding one valve seat at an adjusted distance from the other independently of the position of the cover relative to said bowl.

5. A meter comprising a bowl, a cylinder block mounted thereon, means forming ports and forming an associated valve seat in said block, a cover mounted on said cylinder block and said bowl, a valve slidable on said seat for controlling flow through said ports, spaced-apart supporting standards projecting from said block under said cover, a plate having on one of its sides a valve seat spaced from said first-named valve seat, and means for adjustably securing said plate on said standards independently of the relative positions of said cover and said block and bowl.

6. A volumetric displacement meter comprising a plurality of cylinders each having ports and each having a piston reciprocable therein, a plurality of rods one secured to each of said pistons, a plurality of standards one secured to each of said cylinders and extending therefrom, said standards being tubular to afford guideways for said rods, a slidable valve for controlling said ports of said cylinders, means operatively associated with the pistons for operating said valve, means affording spaced valve seats for said valve, and means on said standards for adjustably spacing one of said valve seats with respect to another.

7. In a meter, the combination with a support having an inlet port and an outlet port, of displacement mechanism associated with said support and comprising a wabble plate and a guide rail therefor, said guide rail having a space therebelow, valve mechanism for controlling said displacement mechanism and the flow therethrough, means operatively associated with the wabble plate for operating said valve mechanism, and means for directing the discharge from said valve mechanism downwardly to the space below said rail and thence upwardly to said outlet port.

8. In a meter, the combination of means providing a group of associated cylinders, each cylinder having an elongated port provided with parallel walls, said ports being disposed symmetrically about and spaced from the common central axis of said cylinders, a piston in each cylinder, a shaft at said central axis, connections from each piston to said shaft for rotating the latter, a single valve drivingly connected with the shaft and having a number of side portions corresponding to the number of ports and arranged so that a particular side portion is associated with a particular port only, and means whereby said valve is caused to move so any side portion always moves in a direction parallel to the spaced apart walls of its corresponding port.

9. In a meter, the combination of means forming four cylinders spaced apart and symmetrically disposed about a common center, the adjacent sides of the cylinder walls at said central space being provided with spaced apart webs forming a hub at their junction and providing intervening passages for the liquid, a central shaft mounted in said hub, a piston for each cylinder, a wobble-plate and operative connections between the wobble plate and each piston, connections from the central part of said wobble-plate for rotating said shaft, each cylinder having an elongated port provided with spaced apart parallel walls, said four ports being disposed in symmetrically spaced apart relation with respect to the common central axis of said cylinders, said ports being arranged in parallel disposed pairs, and a valve seated on the tops of said cylinders and being a continuous, imperforate, peripheral wall of square outline and of sufficient width to cover each of the ports when placed thereacross, said valve having spaced-apart webs providing a central hub with the intervening openings between the webs, and an eccentric connection from said shaft to said central hub for moving said valve eccentrically upon the rotation of said shaft, and means connected to said valve whereby to move the peripheral wall portions thereof in parallel relation to the parallel ports.

10. In a meter having a plurality of cylinders provided with ports, a piston in each cylinder, a valve operatively associated with the ported cylinder walls for controlling said ports, connections from the pistons for operating the valve, a cover detachably mounted on said cylinder walls and spaced from the ported cylinder walls to provide a passageway for the flow of liquid and for housing said valve, said cylinder walls having lateral projections housed within said cover, and a valve plate adjustably mounted on said projections independently of the cover and adjustable to press the valve against the ported cylinder wall.

11. In a meter, the combination with wall portions providing a plurality of cylinders, a cover portion detachably mounted on said cylinders, each of said cylinders being provided with a port, and each cylinder having an opening therein, a tubular sleeve detachably mounted in each said opening and housed within the cover, a piston in each cylinder, each piston having a rod guidingly mounted in said sleeves, a valve shiftably associated with the ported cylinder walls, a connection from each piston to said valve for operating the latter, and a valve plate adjustably carried by said sleeves, and arranged for adjustable contact with said valve.

12. In a meter, the combination of means forming a casing and cylinders, each of said cylinders having a port and being formed with an opening, a piston in each cylinder, valve mechanism associated with said ports, connections from each piston to the valve mechanism, each cylinder opening having a sleeve mounted therein and projecting outwardly thereof, and a guide member on each piston and slidable in said sleeves, the outer portion of each sleeve being threaded, a valve plate having a plurality of openings, each passing over the threaded portions of said sleeves, and adjusting means on each sleeve for adjusting the valve plate with respect thereto.

13. In a meter, the combination of means forming a casing and cylinders, each of said cylinders having a port and being formed with an opening, a piston in each cylinder, valve mechanism associated with said ports, connections from each piston to the valve mechanism, each cylinder opening having a sleeve mounted therein and projecting outwardly thereof, a guide member on each piston and slidable in said sleeves, the outer portion of each sleeve being threaded, a valve plate having a plurality of openings, each passing over the threaded portion of each said sleeve, adjusting means on each sleeve for adjusting the valve plate with respect thereto, and a cover detachably connected to said cylinders and enclosing said valve plate and sleeve.

14. In a meter, the combination with a lower casing member, a cylinder block detachably mounted on said lower casing member, and a cover detachably mounted on said casing and cylinder block, a piston in each cylinder of the block, said cylinders being spaced apart centrally to provide a liquid opening and a central bearing, a shaft rotatably mounted in said central bearing, a wobble-plate in the lower casing, connections from the wobble-plate to the pistons and to the rotatable shaft, each of said cylinders having a projecting hollow sleeve, and each piston having a piston rod formed with a guide sliding in a sleeve, a valve operatively associated with the cylinder block and adapted to control the cylinder ports thereof, said valve having a central hub forming a bearing, a shaft in said bearing and having a crank arm connection with the rotatable shaft, and a valve plate adjustably mounted on each of said projecting sleeves and adapted to bear against the valve, said valve plate having a central bearing and a shaft having a crank connected with the crank arm of said valve, and registering mechanism connected to the crank arm mechanism of said valve plate.

15. In a meter, the combination with a lower casing providing a bowl, a multi-cylinder block mounted on the upper part of said casing with the cylinders thereof projecting into said bowl, a cover mounted on said cylinder block, said cover providing a liquid passageway above said block, there being ports in each cylinder connected with said passageway, and there being a passage formed between said cylinders and connected with said passageway and said bowl, said cover having an inlet connected with said passageway and having an outlet connecting only with said bowl, a wobble-plate mounted in the bottom of said bowl, a piston in each cylinder and connections therefrom to said wobble-plate, a valve associated with said cylinder block for controlling the ports thereof, connections from said wobble-plate to said valve for operating the latter, said bowl having a downwardly extending wall portion for compelling the fluid passing through said bowl to be directed to the lowermost portions thereof in passing through the fluid outlet.

HOSMER L. BLUM.